US012196492B2

(12) United States Patent
Obara et al.

(10) Patent No.: US 12,196,492 B2
(45) Date of Patent: Jan. 14, 2025

(54) HEAT TREATMENT APPARATUS AND HEAT TREATMENT METHOD

(71) Applicant: Tokyo Electron Limited, Tokyo (JP)

(72) Inventors: Kazuteru Obara, Iwate (JP); Tatsuya Yamaguchi, Iwate (JP)

(73) Assignee: Tokyo Electron Limited, Tokyo (JP)

( * ) Notice: Subject to any disclaimer, the term of this patent is extended or adjusted under 35 U.S.C. 154(b) by 310 days.

(21) Appl. No.: 17/662,699

(22) Filed: May 10, 2022

(65) Prior Publication Data

US 2022/0373260 A1 Nov. 24, 2022

(30) Foreign Application Priority Data

May 24, 2021 (JP) ................................ 2021-086683

(51) Int. Cl.

| | |
|---|---|
| ***H01L 21/67*** | (2006.01) |
| ***F27D 21/00*** | (2006.01) |
| *F27D 9/00* | (2006.01) |
| *F27D 19/00* | (2006.01) |

(52) U.S. Cl.

CPC .. *F27D 21/0014* (2013.01); *F27D 2009/0005* (2013.01); *F27D 2019/0056* (2013.01); *F27D 2021/0007* (2013.01)

(58) Field of Classification Search

CPC ..... F27D 2009/0005; F27D 2019/0056; F27D 11/00; F27D 2007/026; F27D 2007/045; F27D 2009/0075; H01L 21/67248; H01L 21/67253; H01L 21/67098; F27B 17/0025

See application file for complete search history.

(56) References Cited

U.S. PATENT DOCUMENTS

| | | | | |
|---|---|---|---|---|
| 10,431,479 | B2 * | 10/2019 | Yamaguchi | H01L 21/67109 |
| 11,114,319 | B2 * | 9/2021 | Yamaguchi | H01L 21/67109 |
| 11,367,633 | B2 * | 6/2022 | Yamaguchi | C23C 16/4584 |
| 11,894,249 | B2 * | 2/2024 | Oikawa | C23C 16/401 |
| 11,927,394 | B2 * | 3/2024 | Yamaguchi | F27D 11/00 |
| 2008/0182345 | A1 * | 7/2008 | Sugishita | H01L 22/20 118/712 |
| 2011/0223693 | A1 * | 9/2011 | Sugishita | F27B 17/0025 219/385 |

FOREIGN PATENT DOCUMENTS

| | | | | |
|---|---|---|---|---|
| CN | 111023841 A | * | 4/2020 | F27B 17/0025 |
| JP | 2012-080080 | | 4/2012 | |
| JP | 2012182310 A | * | 9/2012 | F27B 17/0025 |

(Continued)

*Primary Examiner* — Gregory A Wilson

(74) *Attorney, Agent, or Firm* — IPUSA, PLLC

(57) ABSTRACT

A heat treatment apparatus including: a cylindrical processing container; a heater configured to heat the processing container; and a cooler configured to cool the processing container, wherein the cooler includes: discharge holes provided at intervals in a longitudinal direction of the processing container, the discharge holes being configured to discharge a cooling medium toward the processing container; a branch configured to divide the cooling medium into a plurality of flowing paths that communicate with the discharge holes; and blowers provided for respective ones of the flowing paths, the blowers being configured to send the cooling medium to the discharge holes that communicate with the respective ones of the flowing paths.

15 Claims, 14 Drawing Sheets

(56) References Cited

FOREIGN PATENT DOCUMENTS

| | | | | | |
|---|---|---|---|---|---|
| JP | 5376819 | B2 | * | 12/2013 | |
| JP | 2019-054232 | | | 4/2019 | |
| JP | 2020013967 | A | * | 1/2020 | ....... C23C 16/45578 |
| JP | 2020-088207 | | | 6/2020 | |
| TW | I288946 | B | * | 10/2007 | |

* cited by examiner

HEAT TREATMENT APPARATUS AND HEAT TREATMENT METHOD

CROSS-REFERENCE TO RELATED APPLICATIONS

The present application is based on and claims priority to Japanese Patent Application No. 2021-086683 filed on May 24, 2021, the contents of which are incorporated herein by reference in their entirety.

TECHNICAL FIELD

The disclosures herein generally relate to a heat treatment apparatus and a heat treatment method.

BACKGROUND

A heat treatment apparatus having a plurality of discharge holes along a longitudinal direction of a processing container for blowing a cooling medium toward the processing container is known (see, for example, Japanese Patent Laid-Open No. 2020-088207). In Japanese Patent Laid-Open No. 2020-088207, a flow rate of the cooling medium is controlled by opening and closing the discharge holes by a shutter mechanism.

SUMMARY

According to an embodiment, a heat treatment apparatus includes: a cylindrical processing container; a heater configured to heat the processing container; and a cooler configured to cool the processing container, wherein the cooler includes: discharge holes provided at intervals in a longitudinal direction of the processing container, the discharge holes being configured to discharge a cooling medium toward the processing container; a branch configured to divide the cooling medium into a plurality of flowing paths that communicate with the discharge holes; and blowers provided for respective ones of the flowing paths, the blowers being configured to send the cooling medium to the discharge holes that communicate with the respective ones of the flowing paths.

DETAILED DESCRIPTION

Figure 1:
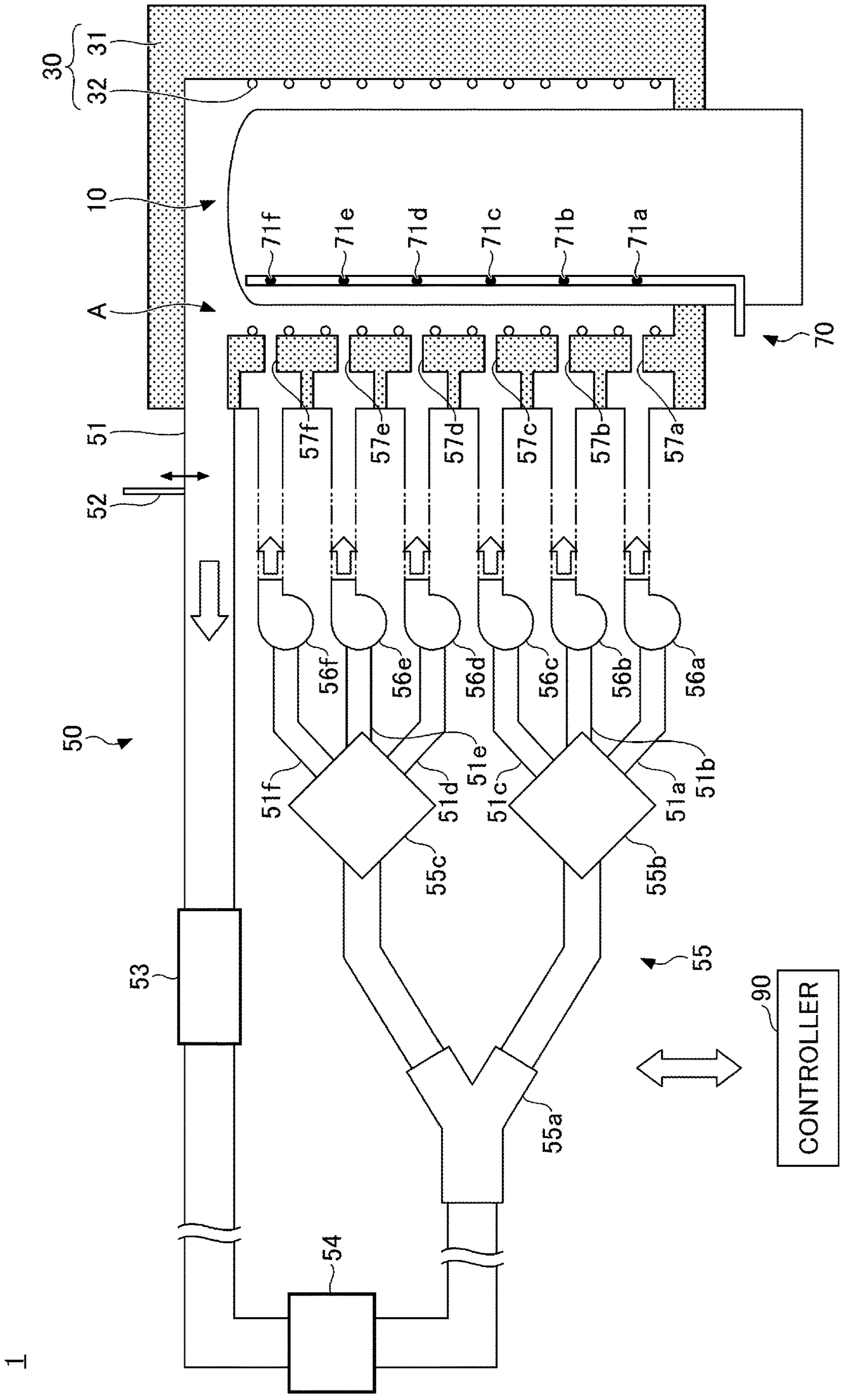
FIG. 1 is a diagram illustrating an example of a heat treatment apparatus according to the first embodiment.

In the following, non-limiting exemplary embodiments of the present disclosure will be described with reference to the accompanying drawings. In all the accompanying drawings, the same or corresponding members or parts are designated by the same or corresponding reference numerals, and duplicate description is omitted.

First Embodiment (Heat Treatment Apparatus)

Figure 2:
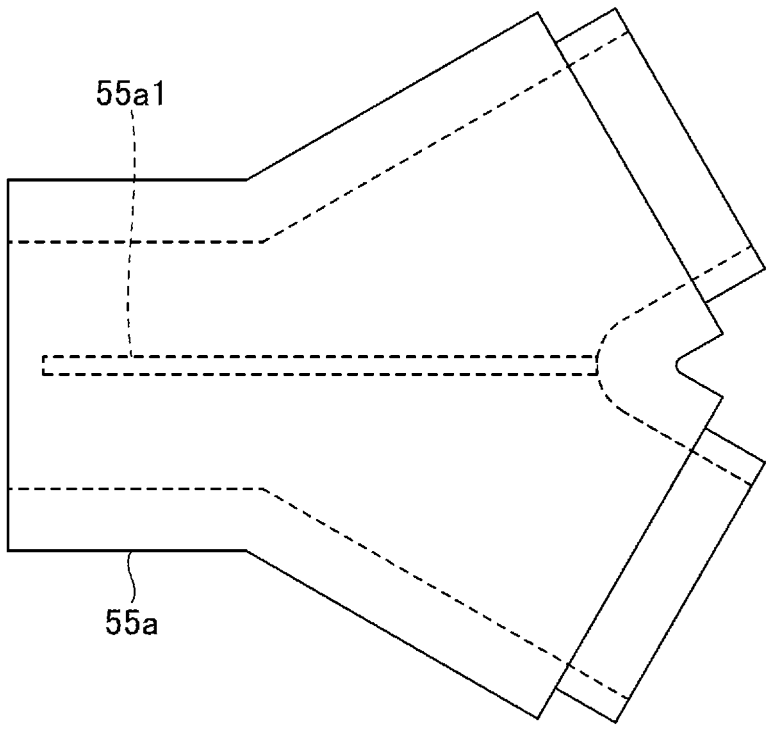
FIG. 2 is a diagram illustrating an example of a partition plate included in a branch of the heat treatment apparatus of FIG. 1.

Referring to FIGS. 1 to 3, an example of a heat treatment apparatus 1 according to the first embodiment will be described.

The heat treatment apparatus 1 according to the first embodiment includes a processing container 10, a heater 30, a cooler 50, a temperature detector 70, a controller 90, and the like.

The processing container 10 is a cylindrical container containing a boat (not illustrated). The boat holds a plurality of substrates spaced in the height direction. The substrate is, for example, a semiconductor wafer. The processing container 10 may have a single tube structure or a double tube structure. The processing container 10 is formed of a refractory material, such as quartz. The inside of the processing container 10 is depressurized by an exhaust (not illustrated). The exhaust includes a pressure regulating valve, a vacuum pump, and the like. Various gases are introduced into the processing container 10 by a gas supply (not illustrated). The gas supply includes an open/close valve, a flow rate controller, and the like. The various gases include, for example, a deposition gas, a processing gas such as an etching gas, a purge gases such as an inert gas, and the like.

The heater 30 is provided around the processing container 10 to heat a substrate in the processing container 10. The heater 30 includes an insulating member 31, a heat generator 32, and the like.

The insulating member 31 has a cylindrical shape. The insulating member 31 forms a space A with the outer wall of the processing container 10. The insulating member 31 is formed of silica and alumina as main components. The shape and material of the insulating member 31 are not limited.

The heat generator 32 is in the form of a line and is provided on the inner side wall of the insulating member 31 in a spiral or meandering form. The heat generator 32 generates heat according to the magnitude of electric power (hereinafter, also referred to as "heater electric power") supplied from a power source (not illustrated). The heat generator 32 is preferably divided into a plurality of zones in the height direction of the processing container 10. Accordingly, the temperature can be controlled independently for each zone.

The heater 30 preferably has a casing made of metal, such as stainless steel, that covers the outer periphery of the insulating member 31. Accordingly, the insulating member 31 can be reinforced and the shape of the insulating member 31 can be maintained. The heater 30 preferably has a water-cooled jacket that covers the outer periphery of the casing. Accordingly, thermal influence on the outside of the insulating member 31 can be reduced.

The cooler 50 cools the processing container 10 by supplying a cooling medium to the space A. The cooling medium may be, for example, air. The cooler 50 includes a medium flowing path 51, an open/close valve 52, an air flow meter 53, a heat exchanger 54, a branch 55, blowers 56*a* to 56*f*, discharge holes 57*a* to 57*f*, and the like.

One end of the medium flowing path 51 communicates with the space A above the uppermost discharge hole 57*f*. The other end of the medium flowing path 51 is branched into six flowing paths 51*a* to 51*f* at the branch 55 and communicates with the discharge holes 57*a* to 57*f*. The medium flowing path is provided with, from the one end side, the open/close valve 52, the air flow meter 53, the heat exchanger 54, the branch 55, and the blowers 56*a* to 56*f*, in this order.

The open/close valve 52 opens and closes the medium flowing path 51. When the open/close valve 52 is opened, the cooling medium that recovered heat in the space A flows into the medium flowing path 51. When the open/close valve 52 is closed, the flow of the cooling medium that recovered heat in the space A into the medium flowing path 51 is interrupted.

The air flow meter 53 detects an air flow rate of the cooling medium flowing through the medium flowing path 51. The air flow meter 53 transmits the detected value to the controller 90.

The heat exchanger 54 cools the cooling medium flowing through the medium flowing path 51.

The branch 55 causes the medium flowing path 51 to be branched into the six flowing paths 51*a* to 51*f*. The branch 55 includes a two-branch chamber 55*a* and three-branch chambers 55*b* and 55*c*.

The two-branch chamber 55*a* causes the medium flowing path 51 to be branched into two flowing paths. As illustrated in FIG. 2, it is preferable that a partition plate 55*a*1 is provided inside the two-branch chamber 55*a* along the direction in which the cooling medium flows. Accordingly, the cooling medium can be prevented from flowing backward.

The three-branch chamber 55*b* is provided after the two-branch chamber 55*a*. The three-branch chamber 55*b* causes one of the flowing paths, which has been branched by the two-branch chamber 55*a*, to be branched into three flowing paths 51*a* to 51*c*. The three-branch chamber 55*c* is provided after the two-branch chamber 55*a*. The three-branch chamber 55*c* causes the other flowing path, which has been branched by the two-branch chamber 55*a*, to be branched into three flowing paths 51*d* to 51*f*. It is preferable that a partition plate (not illustrated) is provided inside each of the three-branch chambers 55*b* and 55*c* along the direction in which the cooling medium flows. Accordingly, the cooling medium can be prevented from flowing backward.

Figure 3A:
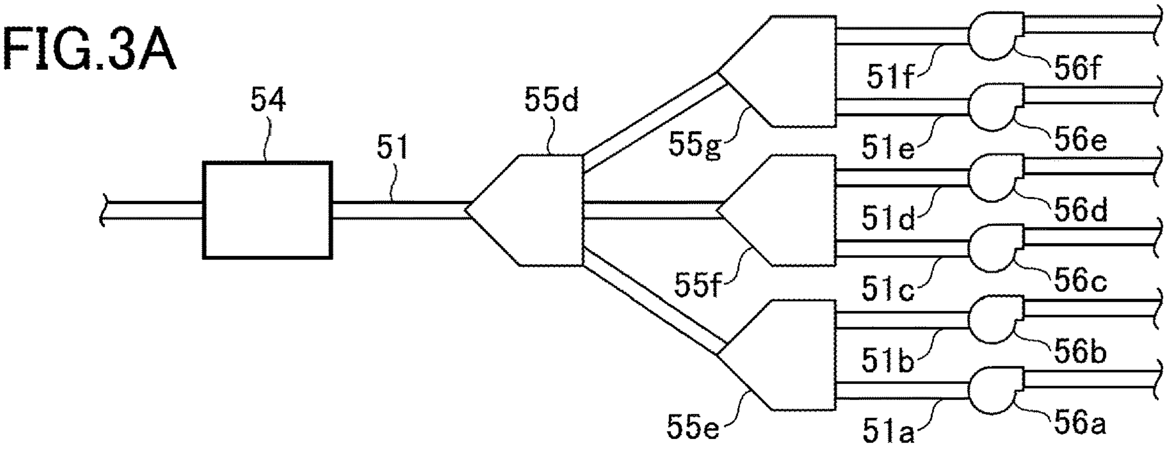
FIGS. 3A to 3C are diagrams illustrating modification examples of a branch of the heat treatment apparatus of FIG. 1.
Figure 3B:
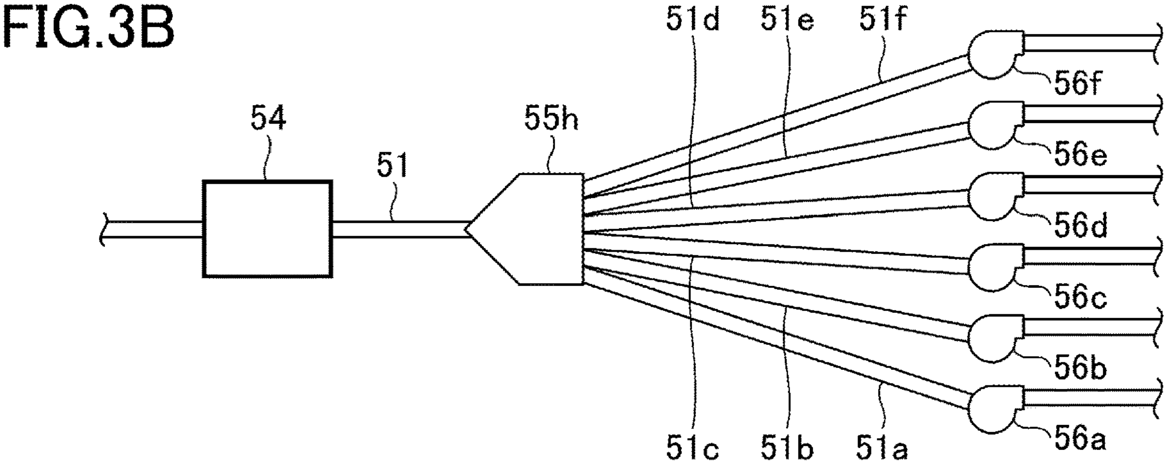
Figure 3C:
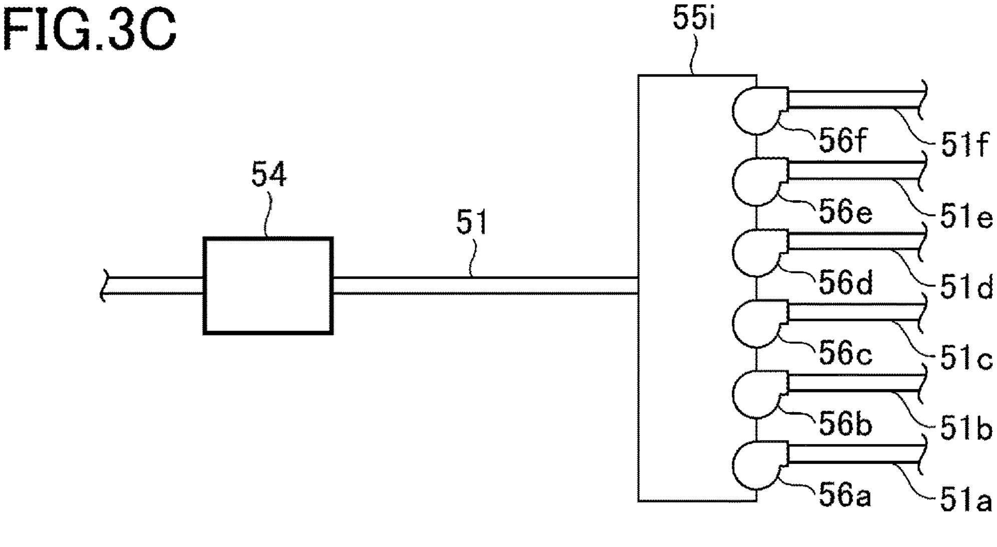

In the example of FIG. 1, the case in which the medium flowing path 51 is branched into the six flowing paths 51*a* to 51*f* by the one two-branch chamber 55*a* and the two three-branch chambers 55*b* and 55*c* provided after the two-branch chamber 55*a* is described. However, the configuration is not limited thereto. For example, as illustrated in FIG. 3A, the medium flowing path 51 may be branched into the six flowing paths 51*a* to 51*f* by one three-branch chamber 55*d* and three two-branch chambers 55*e* to 55*g* provided after the three-branch chamber 55*d*. For example, as illustrated in FIG. 3B, one six-branch chamber 55*h* may cause the medium flowing path 51 to be branched into the six flowing paths 51*a* to 51*f*. In this manner, the branch 55 may be configured to cause the medium flowing path 51 to be branched into the six flowing paths 51*a* to 51*f* by a plurality of branch chambers provided in multiple stages, and may be configured to cause the medium flowing path 51 to be branched into the six flowing paths 51*a* to 51*f* by one branch chamber. The medium flowing path 51 may be branched into the six flowing paths 51*a* to 51*f* by one branch box 55*i*, for example, as illustrated in FIG. 3C.

The blowers 56*a* to 56*f* are provided corresponding to each of the flowing paths 51*a* to 51*f*. The blowers 56*a* to 56*f* send the cooling medium to the discharge holes 57*a* to 57*f* of the corresponding flowing paths 51*a* to 51*f*. The blowers 56*a* to 56*f* are independently controlled by the controller 90. The rotation speeds of the blowers 56*a* to 56*f* change according to the supplied voltage. For example, the rotation speeds of the blowers 56*a* to 56*f* increases as the supplied voltage increases, thereby increasing the air flow rate of the cooling medium sent to the discharge holes 57*a* to 57*f*.

The discharge holes 57*a* to 57*f* are provided at intervals in a longitudinal direction of the processing container 10, and discharge the cooling medium toward the processing container 10 in a substantially horizontal direction. The discharge holes 57*a* to 57*f* are formed at the other ends of the flowing paths 51*a* to 51*f*, respectively, to penetrate the insulating member 31. The discharge holes 57*a* to 57*f* are provided corresponding to each of the divided six zones of the heat generator 32.

In the cooler 50, the cooling medium that recovered heat in the space A flows into the medium flowing path 51 and is cooled by the heat exchanger interposed in the medium flowing path 51. The cooled cooling medium is divided into the six flowing paths 51*a* to 51*f* at the branch 55, sent to each of the discharge holes 57*a* to 57*f* by the blowers 56*a* to 56*f* in each of the flowing paths 51*a* to 51*f*, and discharged into the space A from each of the discharge holes 57*a* to 57*f*. The cooling medium discharged into the space A cools the processing container 10.

The temperature detector 70 detects the temperature in the processing container 10. The temperature detector 70 is, for example, a thermocouple. The temperature detector 70 includes six temperature sensors 71*a* to 71*f*. The temperature sensors 71*a* to 71*f* are provided corresponding to each of the divided six zones of the heat generator 32. The temperature detector 70 may be provided in the space A outside the processing container 10 and detect the temperature of the space A.

The controller 90 may be, for example, a computer. The controller 90 controls operation of each part of the heat treatment apparatus 1. A computer program that operates each part of the heat treatment apparatus 1 is stored in a storage medium. The storage medium may be, for example, a flexible disk, a compact disk, a hard disk, a flash memory, a DVD, and the like.

For example, the controller 90 controls the heater 30 based on the temperature detected by the temperature detector 70 while independently controlling the voltages supplied to each of the blowers 56*a* to 56*f* and regulates the temperature in the processing container 10, according to the conditions of the heat treatment performed in the heat treatment apparatus 1.

(Heat Treatment Method)

Figure 4:
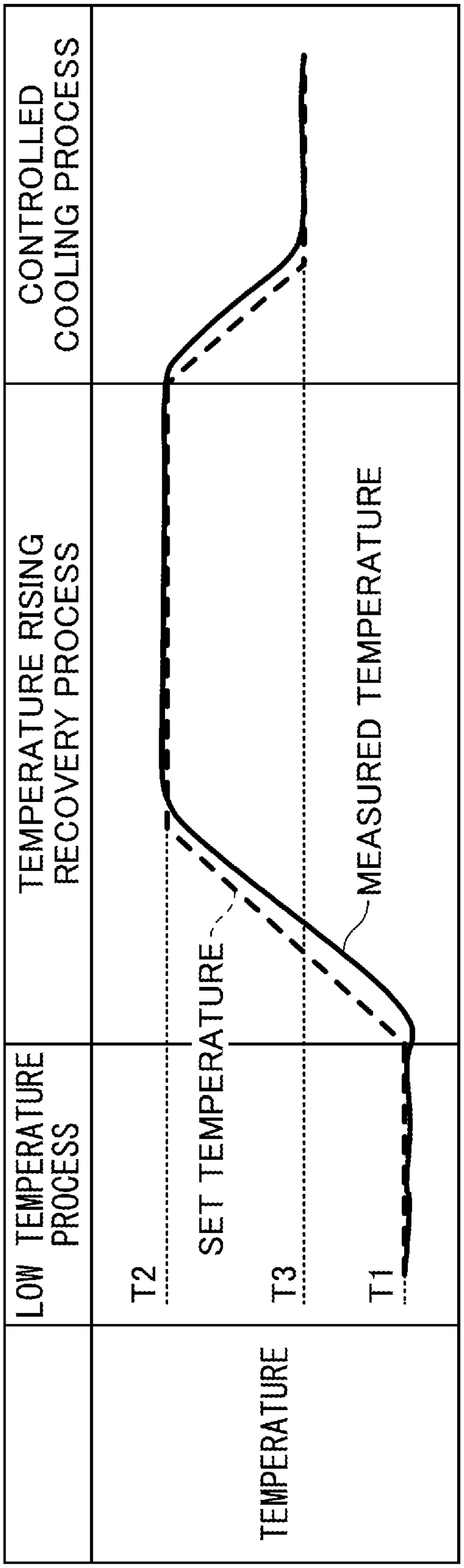
FIG. 4 is a diagram illustrating an example of operation of the heat treatment apparatus according to the first embodiment.

Referring to FIG. 4, an example of a heat treatment method according to the first embodiment will be described. The heat treatment method according to the first embodiment is performed, for example, by controlling operation of each part of the heat treatment apparatus 1 by the controller 90. In the following, each region in the height direction in the heat treatment apparatus 1, which corresponds to the discharge holes 57*a*, 57*b*, 57*c*, 57*d*, 57*e*, and 57*f*, is respectively referred to as a bottom region (BTM), a first center region (CTR-1), a second center region (CTR-2), a third center region (CTR-3), a fourth center region (CTR-4), and a top region (TOP).

As illustrated in FIG. 4, the heat treatment method includes performing, for example, a low temperature process, a temperature rising recovery process, and a controlled cooling process, in this order.

The low temperature process includes processing a substrate contained in the processing container 10 while maintaining a low temperature T1 in the processing container 10. For example, the low temperature process includes tilt controlling in which the controller 90 sets the control temperature of one region, for example, the top region (TOP) to be lower than the control temperature of the other regions (BTM, and CTR-1 to CTR-4). In the low temperature process, the controller 90 controls the heater 30 based on the temperature detected by the temperature detector 70 while independently controlling the voltages supplied to each of the blowers 56*a* to 56*f* and regulates the temperature in the processing container 10 to the low temperature T1. The low temperature T1 may be, for example, 30° C. to 100° C.

The temperature rising recovery process includes changing the temperature in the processing container 10 from the low temperature T1 to a high temperature T2 and stabilizing the temperature in the processing container 10 at the high temperature T2. For example, in the temperature rising recovery process, the controller 90 controls the heater 30 based on the temperature detected by the temperature detector 70 while independently controlling the voltages supplied to each of the blowers 56*a* to 56*f* and changes the temperature in the processing container 10 from the low temperature T1 to the high temperature T2 and stabilizes the temperature. The high temperature T2 may be, for example, 600° C. to 1000° C.

The controlled cooling process includes changing the temperature in the processing container from the high temperature T2 to a predetermined temperature T3 lower than the high temperature T2 and stabilizing the temperature in the processing container 10 at the predetermined temperature T3. For example, in the controlled cooling process, the controller 90 controls the heater 30 based on the temperature detected by the temperature detector 70 while independently controlling the voltages supplied to each of the blowers 56*a* to 56*f* and changes the temperature in the processing container 10 from the high temperature T2 to the predetermined temperature T3 and stabilizes the temperature. The predetermined temperature T3 may be, for example, 100° C. to 600° C.

As described above, according to the heat treatment apparatus 1 according to the first embodiment, the controller 90 controls the heater 30 based on the temperature detected by the temperature detector 70 while independently controlling the voltages supplied to each of the blowers 56*a* to 56*f*. Therefore, because the discharged amount of the cooling medium can be regulated for each region, the temperature variation (interplanar temperature variation) in the height direction of the processing container 10 can be reduced.

For example, in the low temperature process, the tilt controlling may be performed in which the control temperature of one region, for example, the top region, is set to be lower than the control temperature of the other regions. In this case, the controller 90 controls such that the heater electric power for the heat generator 32 corresponding to the top region is smaller than the heater electric power for the other heat generator 32. However, in the low temperature process, the heater electric power for the heat generator 32 corresponding to the top region may become 0%, and the temperature of the top region of the space A may not be controlled to the control temperature. To cope with this, when the low temperature process is performed in the heat treatment apparatus 1, the controller 90 controls such that the voltage supplied to the blower 56*f* provided corresponding to the top region is larger than the voltages supplied to the blowers 56*a* to 56*e* provided corresponding to the other regions. Accordingly, the air flow rate of the cooling medium discharged to the upper part of the space A is larger than the air flow rate of the cooling medium discharged to the middle and the lower parts of the space A. Therefore, it is possible to efficiently cool down the upper part of the space A with respect to the middle and the lower parts of the space A, and it is possible to prevent the heater electric power for the heat generator 32 corresponding to the top region from becoming 0%. As a result, temperature controllability at low temperature is improved.

For example, in the controlled cooling process, there may be interplanar temperature variation during cooling. To cope with this, when the controlled cooling process is performed in the heat treatment apparatus 1, the controller 90 controls the heater 30 based on the temperature detected by the temperature detector 70 while independently controlling the voltages supplied to each of the blowers 56*a* to 56*f*, so that the detection temperatures of each region are the same. Therefore, it is possible to reduce the interplanar temperature variation during cooling.

For example, in the temperature rising recovery process, the overshoot characteristics of one region, for example, the top region, may differ between a plurality of heat treatment apparatuses 1 because there may be an individual difference in parts, an assembly error, a difference in equipment usage environment, and the like, between a plurality of heat treatment apparatuses 1. To cope with this, when the temperature rising recovery process is performed in the heat treatment apparatus 1, the controller 90 controls the heater 30 based on the temperature detected by the temperature detector 70 while independently controlling the voltages supplied to each of the blowers 56*a* to 56*f*, so that the detection temperatures of the top region are the same between the heat treatment apparatuses 1. Therefore, it is possible to reduce the machine difference in the overshoot characteristics between the top regions when the temperature is raised.

Second Embodiment

Figure 5:
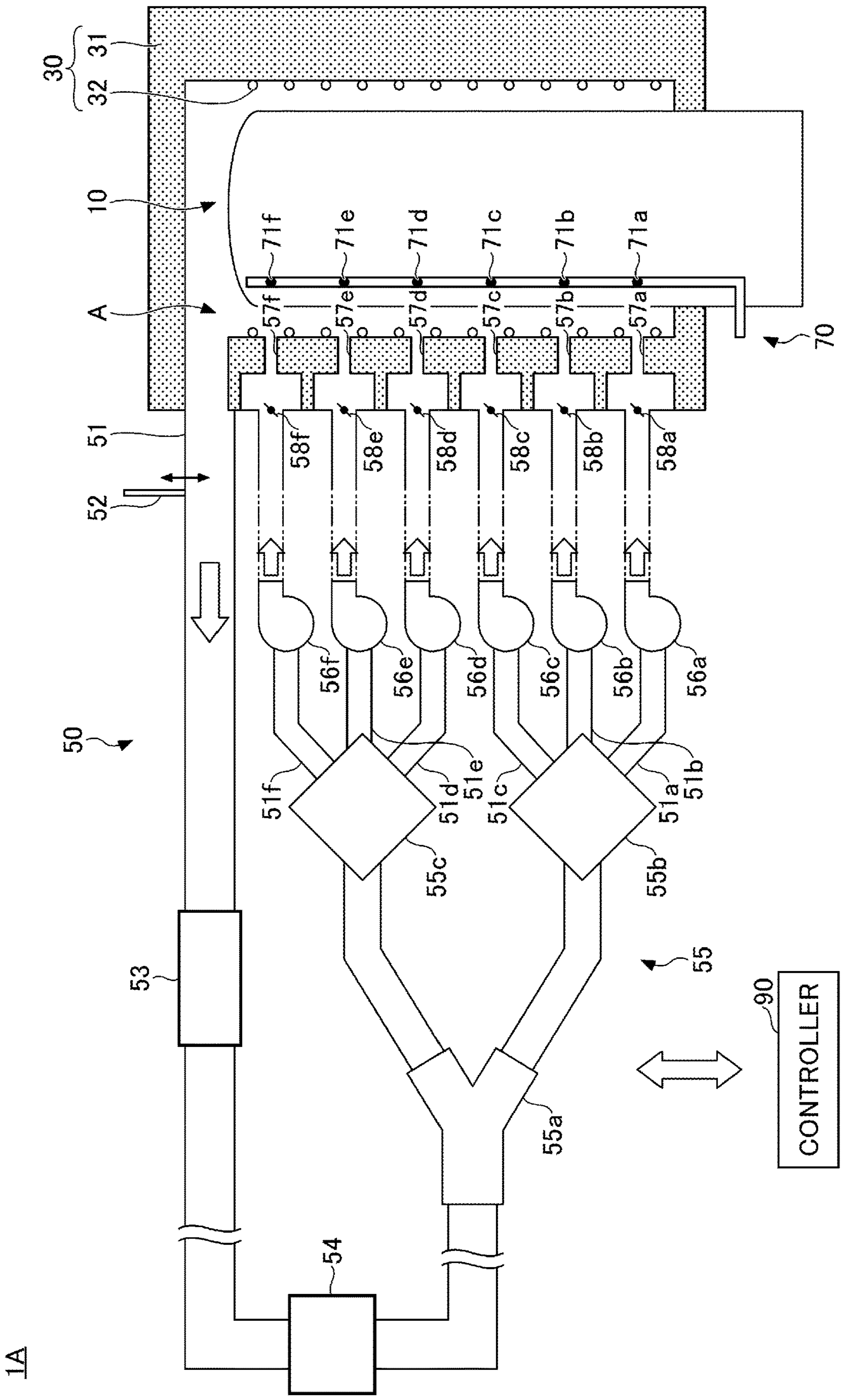
FIG. 5 is a diagram illustrating an example of a heat treatment apparatus according to the second embodiment.

Referring to FIG. 5, an example of a heat treatment apparatus 1A according to the second embodiment will be described.

The heat treatment apparatus 1A according to the second embodiment differs from the heat treatment apparatus 1 in that check valves 58*a* to 58*f* are provided corresponding to each of the flowing paths 51*a* to 51*f*. The other configurations may be the same as those of the heat treatment apparatus 1. In the following, different points from the heat treatment apparatus 1 will be mainly described.

The check valves 58*a* to 58*f* are provided corresponding to each of the flowing paths 51*a* to 51*f*. The check valves 58*a* to 58*f* prevent the backflow of the cooling medium from the discharge holes 57*a* to 57*f* of the corresponding flowing paths 51*a* to 51*f* to the blowers 56*a* to 56*f*. The check valves 58*a* to 58*f* are, for example, opening-angle regulating valves that regulate the conductance of the flowing paths 51*a* to 51*f* by controlling the opening angle.

The controller 90 independently controls the check valves 58*a* to 58*f* according to the operation of the blowers 56*a* to 56*f*. For example, when one or more of the six blowers 56*a* to 56*f* is stopped and the rest are operated, the controller 90 controls to open the check valve corresponding to the blower in operation and close the check valve corresponding to the blower that is stopped.

As described above, the heat treatment apparatus 1A according to the second embodiment has substantially the same configuration as the heat treatment apparatus 1 according to the first embodiment. Therefore, substantially the same effect can be obtained as the heat treatment apparatus 1 according to the first embodiment.

In the heat treatment apparatus 1A according to the second embodiment, the controller 90 independently controls the check valves 58*a* to 58*f* according to the operation of the blowers 56*a* to 56*f*. For example, the controller 90 controls to open the check valve corresponding to the blower in operation, among the blowers 56*a* to 56*f*, and closes the check valve corresponding to the blower that is stopped. Accordingly, the cooling medium discharged from the discharge hole corresponding to the blower in operation can be prevented from flowing backward into the flowing path corresponding to the blower that is stopped.

Third Embodiment

Figure 6:
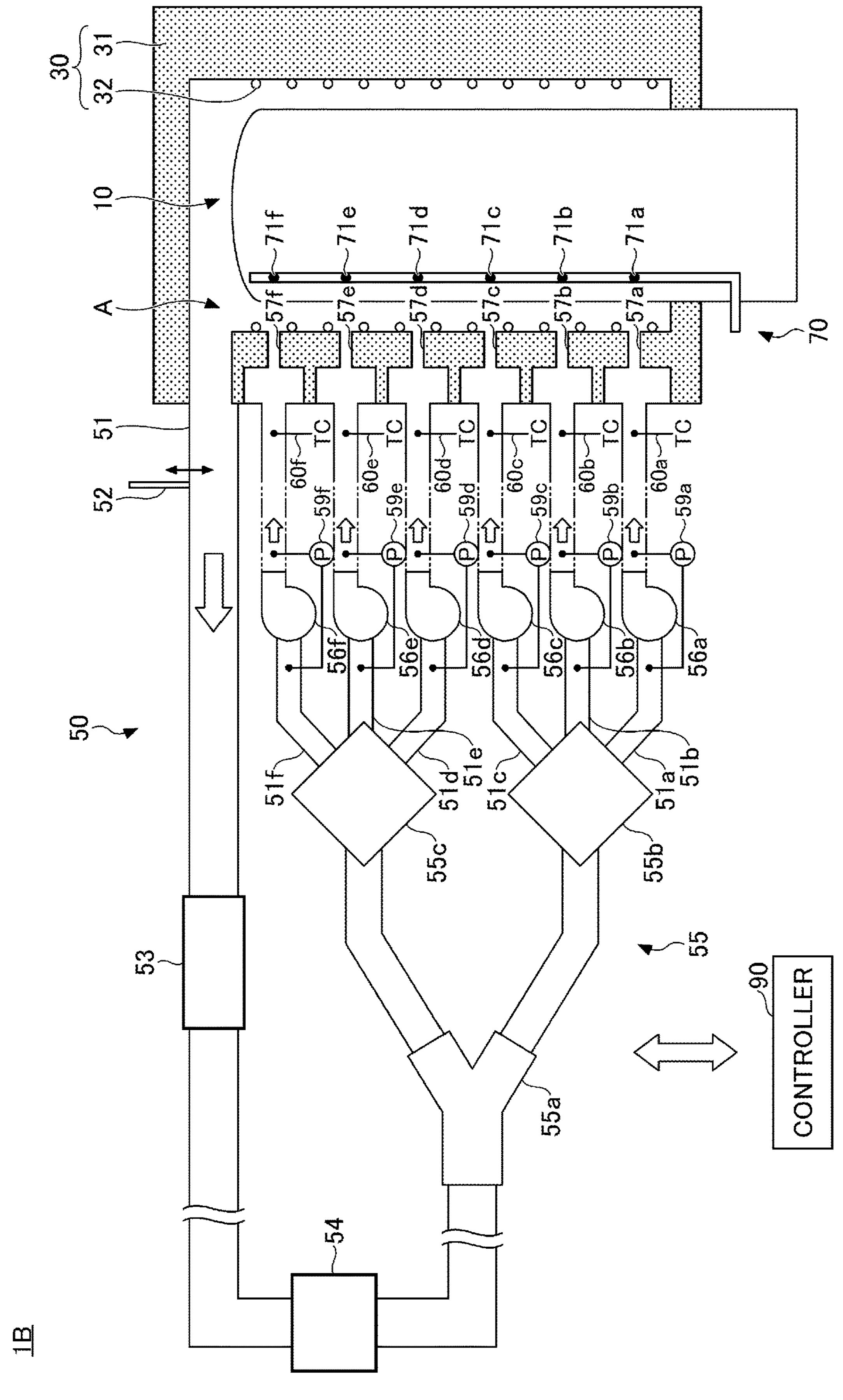
FIG. 6 is a diagram illustrating an example of a heat treatment apparatus according to the third embodiment.

Referring to FIG. 6, an example of the heat treatment apparatus 1B according to the third embodiment will be described.

The heat treatment apparatus 1B according to the third embodiment differs from the heat treatment apparatus 1 in that backflow of the cooling medium is monitored based on a detected value of at least one of pressure sensors 59*a* to 59*f* and temperature sensors 60*a* to 60*f* provided corresponding to each of the flowing paths 51*a* to 51*f*. The other configurations may be the same as those of the heat treatment apparatus 1. In the following, different points from the heat treatment apparatus 1 will be mainly described.

The pressure sensors 59*a* to 59*f* are provided corresponding to each of the flowing paths 51*a* to 51*f*. The pressure sensors 59*a* to 59*f* detect pressure data (an example of a characteristic value) including magnitude relationship between the pressure at the suction side of the blowers 56*a* to 56*f* disposed in the corresponding flowing paths 51*a* to 51*f* and the pressure at the discharge side of the blowers 56*a* to 56*f*, and transmit the detected value to the controller 90. For example, the pressure data may be a differential pressure between the pressures at the suction side and at the discharge side of the blowers 56*a* to 56*f* (the differential pressure before and after the blowers 56*a* to 56*f*). The pressure data may be the pressures at the suction side and at the discharge side of the blowers 56*a* to 56*f*.

The temperature sensors 60*a* to 60*f* are provided corresponding to each of the flowing paths 51*a* to 51*f*. The temperature sensors 60*a* to 60*f* detect the temperature (an example of a characteristic value) of the cooling medium flowing through the corresponding flowing paths 51*a* to 51*f*, and transmit the detected value to the controller 90.

The controller 90 monitors backflow of the cooling medium based on the detected value of at least one of the pressure sensors 59*a* to 59*f* and the temperature sensors 60*a* to 60*f*. For example, the controller 90 determines that backflow of the cooling medium is occurring when the pressure at the discharge side of one or more of the blowers 56*a* to 56*f* is smaller than the pressure at the suction side. For example, the controller 90 determines that backflow of the cooling medium is occurring when the temperature after operating the blowers 56*a* to 56*f* is higher than the temperature before operating the blowers 56*a* to 56*f*, for one or more of the flowing paths 51*a* to 51*f*. The controller 90 notifies the user that the heat treatment apparatus 1 is abnormal when it is determined that backflow of the cooling medium is occurring.

As described above, the heat treatment apparatus 1B according to the third embodiment has substantially the same configuration as the heat treatment apparatus 1 according to the first embodiment. Therefore, substantially the same effect can be obtained as the heat treatment apparatus 1 according to the first embodiment.

In the heat treatment apparatus 1B according to the third embodiment, the controller 90 monitors backflow of the cooling medium based on the detected value of at least one of the pressure sensors 59*a* to 59*f* and the temperature sensors 60*a* to 60*f* provided corresponding to each of the flowing paths 51*a* to 51*f*. Accordingly, the user can easily monitor backflow of the cooling medium.

Fourth Embodiment

Figure 7:
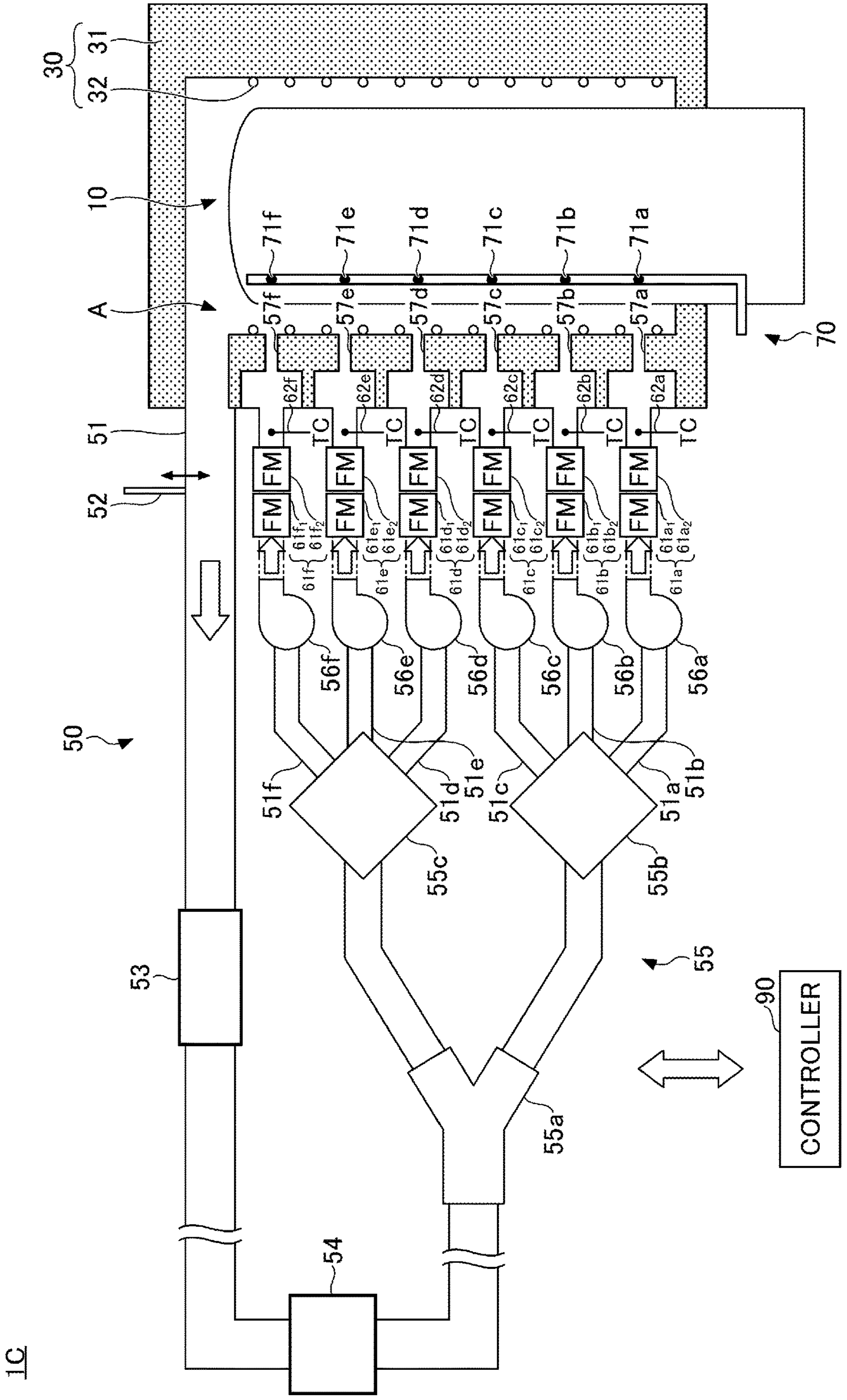
FIG. 7 is a diagram illustrating an example of a heat treatment apparatus according to the fourth embodiment.

Referring to FIG. 7, an example of the heat treatment apparatus 1C according to the fourth embodiment will be described.

The heat treatment apparatus 1C according to the fourth embodiment differs from the heat treatment apparatus 1 in that backflow of the cooling medium is monitored based on a detected value of at least one of flow meters 61*a* to 61*f* and temperature sensors 62*a* to 62*f* provided corresponding to each of the flowing paths 51*a* to 51*f*. The other configurations may be the same as those of the heat treatment apparatus 1. In the following, different points from the heat treatment apparatus 1 will be mainly described.

The flow meters 61*a* to 61*f* include first flow meters $\mathbf{61}a_1$ to $\mathbf{61}f_1$ and second flow meters $\mathbf{61}a_2$ to $\mathbf{61}f_2$.

The first flow meters $\mathbf{61}a_1$ to 61*f*1 are provided corresponding to each of the flowing paths 51*a* to 51*f*. The first flow meters $\mathbf{61}a_1$ to 61*f*1 detect the flow rate (an example of a characteristic value) of the cooling medium sent from the blowers 56*a* to 56*f* to the discharge holes 57*a* to 57*f* through the corresponding flowing paths 51*a* to 51*f*, and transmit the detected value to the controller 90. In the following, the flow sent from the blowers 56*a* to 56*f* to the discharge holes 57*a* to 57*f* is also referred to as forward flow.

The second flow meter $\mathbf{61}a_2$ to $\mathbf{61}f_2$ is provided corresponding to each of the flowing paths 51*a* to 51*f*. The second flow meters 61*a*2 to 61*f*2 detect the flow rate (an example of a characteristic value) of the cooling medium sent from the discharge holes 57*a* to 57*f* to the blowers 56*a* to 56*f* through the corresponding flowing paths 51*a* to 51*f*, and transmit the detected value to the controller 90. In the following, the flow from the discharge holes 57*a* to 57*f* to the blowers 56*a* to 56*f* is also referred to as backflow.

The controller 90 monitors the cooling medium based on the detected value of at least one of the flow meters 61$a$ to 61$f$ and the temperature sensors 62$a$ to 62$f$. For example, the controller 90 determines that backflow of the cooling medium is occurring when the detected value of the second flow meters 61$a_2$ to 61$f_2$ is larger than the detected value of the first flow meters 61$a_1$ to 61$f_1$, for one or more of the flowing paths 51$a$ to 51$f$. For example, the controller 90 determines that backflow of the cooling medium is occurring when the temperature after operating the blowers 56$a$ to 56$f$ is higher than the temperature before operating the blowers 56$a$ to 56$f$, for one or more flowing paths 51$a$ to 51$f$. The controller 90 notifies the user that the heat treatment apparatus 1 is abnormal when it is determined that backflow of the cooling medium is occurring.

As described above, the heat treatment apparatus 1C according to the fourth embodiment has substantially the same configuration as the heat treatment apparatus 1 according to the first embodiment. Therefore, substantially the same effect can be obtained as the heat treatment apparatus 1 according to the first embodiment.

In the heat treatment apparatus 1C according to the fourth embodiment, the controller 90 monitors backflow of the cooling medium based on the detected values of at least one of the flow meters 61$a$ to 61$f$ and the temperature sensors 62$a$ to 62$f$ provided corresponding to each of the flowing paths 51$a$ to 51$f$. Accordingly, the user can easily monitor backflow of the cooling medium.

In the embodiment described above, the case in which the flow meters 61$a$ to 61$f$ detect the forward flow by the first flow meters 61$a_1$ to 61$f$1 and detect the backflow by the second flow meters 61$a_2$ to 61$f_2$ is described. However, the configuration is not limited thereto. For example, the forward flow and the backflow are detected using one flow meter such as an ultrasonic flow meter.

Fifth Embodiment

Figure 8:
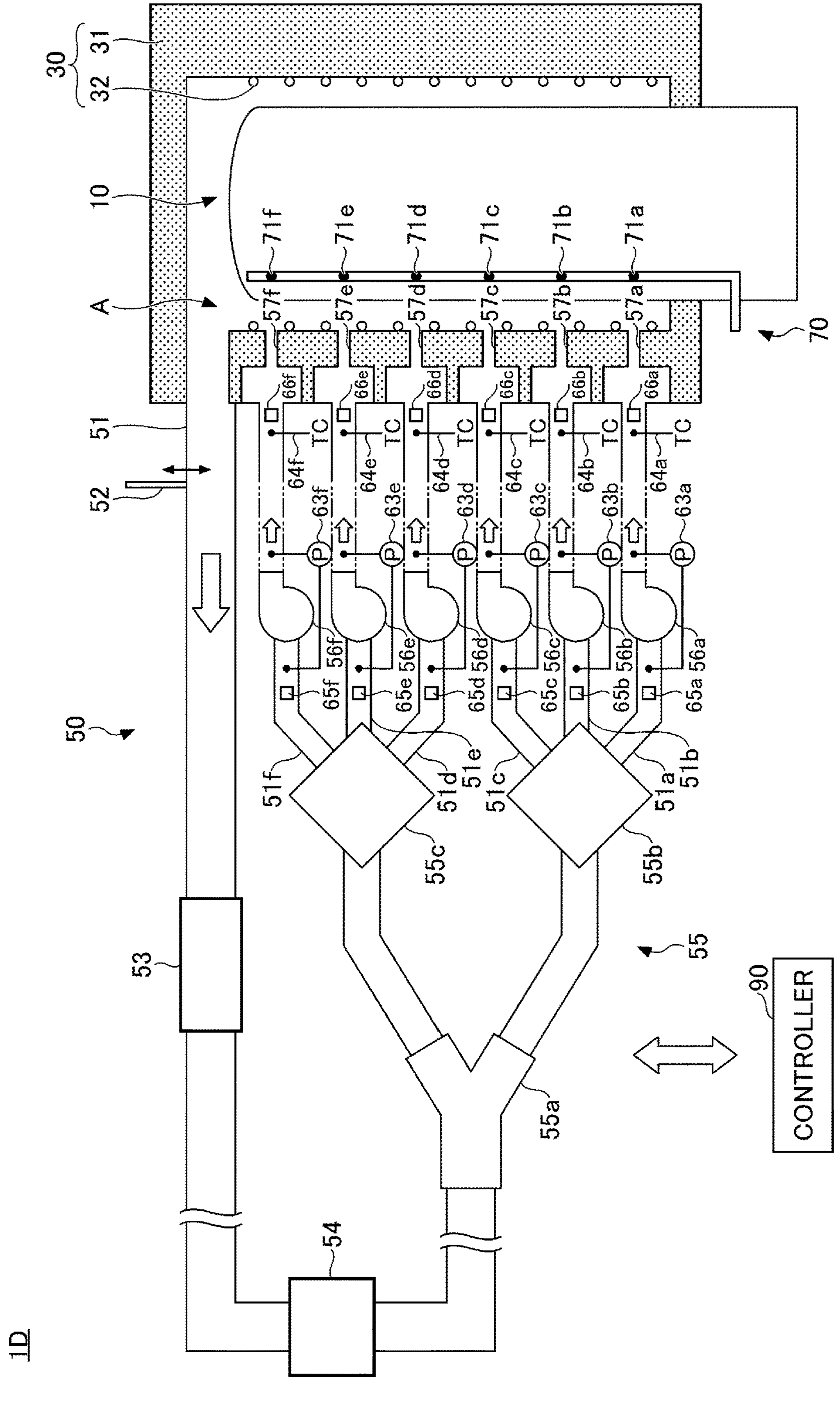
FIG. 8 is a diagram illustrating an example of a heat treatment apparatus according to the fifth embodiment.

Referring to FIG. 8, an example of a heat treatment apparatus 1D according to the fifth embodiment will be described.

The heat treatment apparatus 1D according to the fifth embodiment differs from the heat treatment apparatus 1 in that the internal pressure (heater internal pressure) of the space A is regulated based on the detected value of at least one of the pressure sensors 63$a$ to 63$f$ and the temperature sensors 64$a$ to 64$f$ provided corresponding to each of the flowing paths 51$a$ to 51$f$. The other configurations may be the same as those of the heat treatment apparatus 1. In the following, different points from the heat treatment apparatus 1 will be mainly described.

The heat treatment apparatus 1D according to the fifth embodiment further includes pressure sensors 63$a$ to 63$f$, temperature sensors 64$a$ to 64$f$, suction side slits 65$a$ to 65$f$, and discharge side slits 66$a$ to 66$f$, with respect to the heat treatment apparatus 1.

The pressure sensors 63$a$ to 63$f$ are provided corresponding to each of the flowing paths 51$a$ to 51$f$. The pressure sensors 63$a$ to 63$f$ detect pressure data (an example of a characteristic value) including magnitude relationship between the pressure at the suction side of the blowers 56$a$ to 56$f$ disposed in the corresponding flowing paths 51$a$ to 51$f$ and the pressure at the discharge side of the blowers 56$a$ to 56$f$, and transmit the detected value to the controller 90. For example, the pressure data may be a differential pressure between the pressures at the suction side and at the discharge side of the blowers 56$a$ to 56$f$ (the differential pressure before and after the blowers 56$a$ to 56$f$). The pressure data may be the pressures at the suction side and at the discharge side of the blowers 56$a$ to 56$f$.

The temperature sensors 64$a$ to 64$f$ are provided corresponding to each of the flowing paths 51$a$ to 51$f$. The temperature sensors 64$a$ to 64$f$ detect the temperature (an example of a characteristic value) of the cooling medium flowing through the corresponding flowing paths 51$a$ to 51$f$, and transmit the detected value to the controller 90.

The suction side slits 65$a$ to 65$f$ are provided on the suction side of the blowers 56$a$ to 56$f$ provided in the corresponding flowing paths 51$a$ to 51$f$. The suction side slits 65$a$ to 65$f$ are configured to be openable and closable. When the suction side slits 65$a$ to 65$f$ are opened, air flows into the corresponding flowing paths 51$a$ to 51$f$ from the outside. Accordingly, the heater internal pressure can be regulated toward positive pressure.

The discharge side slits 66$a$ to 66$f$ are provided on the discharge side of the blowers 56$a$ to 56$f$ provided in the corresponding flowing paths 51$a$ to 51$f$. The discharge side slits 66$a$ to 66$f$ are configured to be openable and closable. When the discharge side slits 66$a$ to 66$f$ are opened, the cooling medium flows out from the corresponding flowing paths 51$a$ to 51$f$ to the outside. Accordingly, the heater internal pressure can be regulated toward negative pressure.

The controller 90 regulates the heater internal pressure by controlling opening and closing of the suction side slits 65$a$ to 65$f$ and the discharge side slits 66$a$ to 66$f$ based on the detected value of at least one of the pressure sensors 63$a$ to 63$f$ and the temperature sensors 64$a$ to 64$f$. For example, when the heater internal pressure is higher than the atmospheric pressure, the controller 90 regulates the heater internal pressure toward negative pressure by opening the discharge side slits 66$a$ to 66$f$ so that the heater internal pressure is controlled to be the atmospheric pressure or a pressure slightly lower than the atmospheric pressure. Accordingly, it is possible to prevent the cooling medium in the space A, which has a high temperature, from leaking to the outside.

As described above, the heat treatment apparatus 1D according to the fifth embodiment has substantially the same configuration as the heat treatment apparatus 1 according to the first embodiment. Therefore, substantially the same effect can be obtained as the heat treatment apparatus 1 according to the first embodiment.

In the heat treatment apparatus 1D according to the fifth embodiment, the controller 90 regulates the internal pressure (heater internal pressure) of the space A based on the detected value of at least one of the pressure sensors 63$a$ to 63$f$ and the temperature sensors 64$a$ to 64$f$ provided corresponding to each of the flowing paths 51$a$ to 51$f$. Accordingly, it is possible to prevent the cooling medium in the space A, which has a high temperature, from leaking to the outside.

Sixth Embodiment

Figure 9:
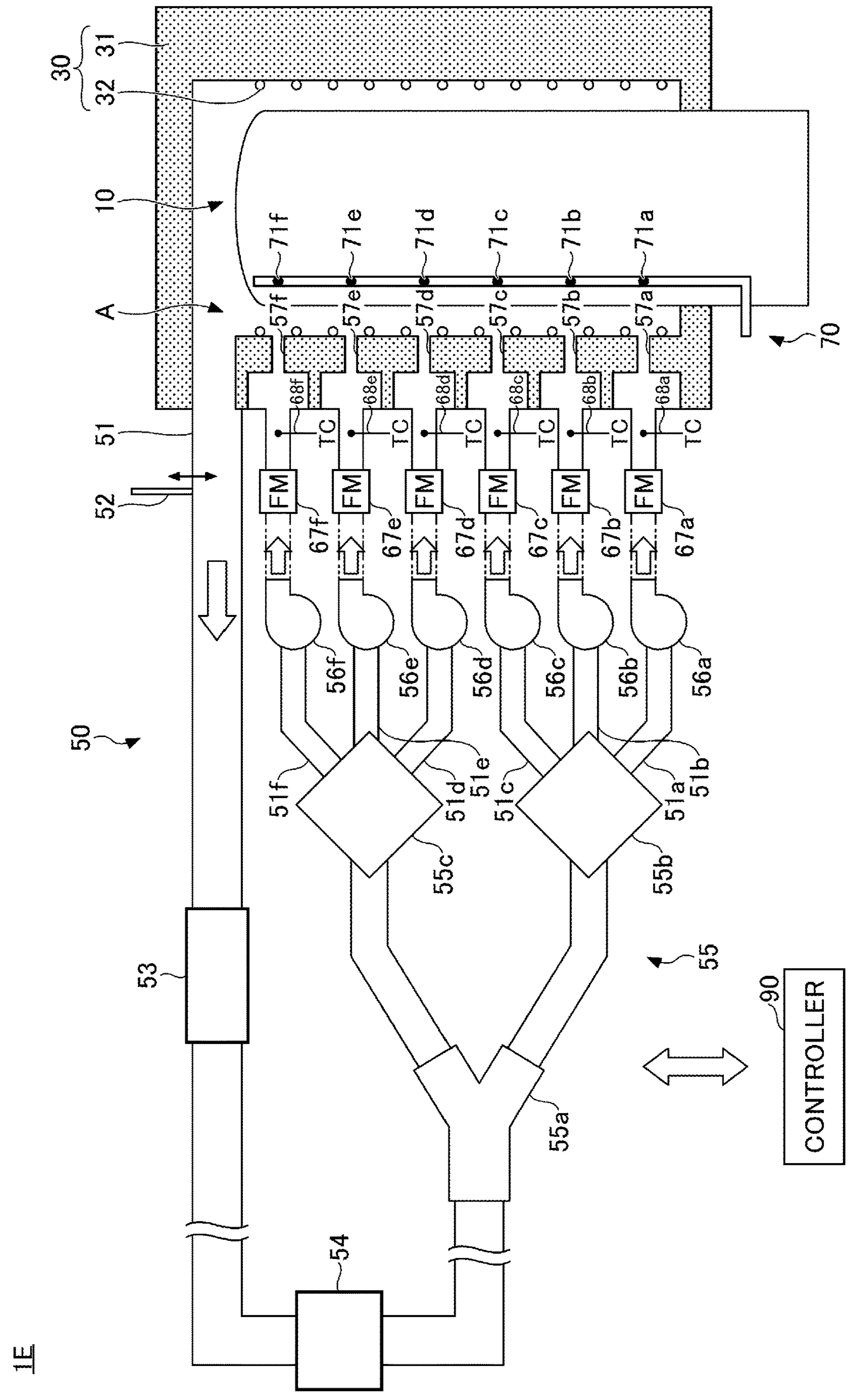
FIG. 9 is a diagram illustrating an example of a heat treatment apparatus according to the sixth embodiment.
Figure 10:
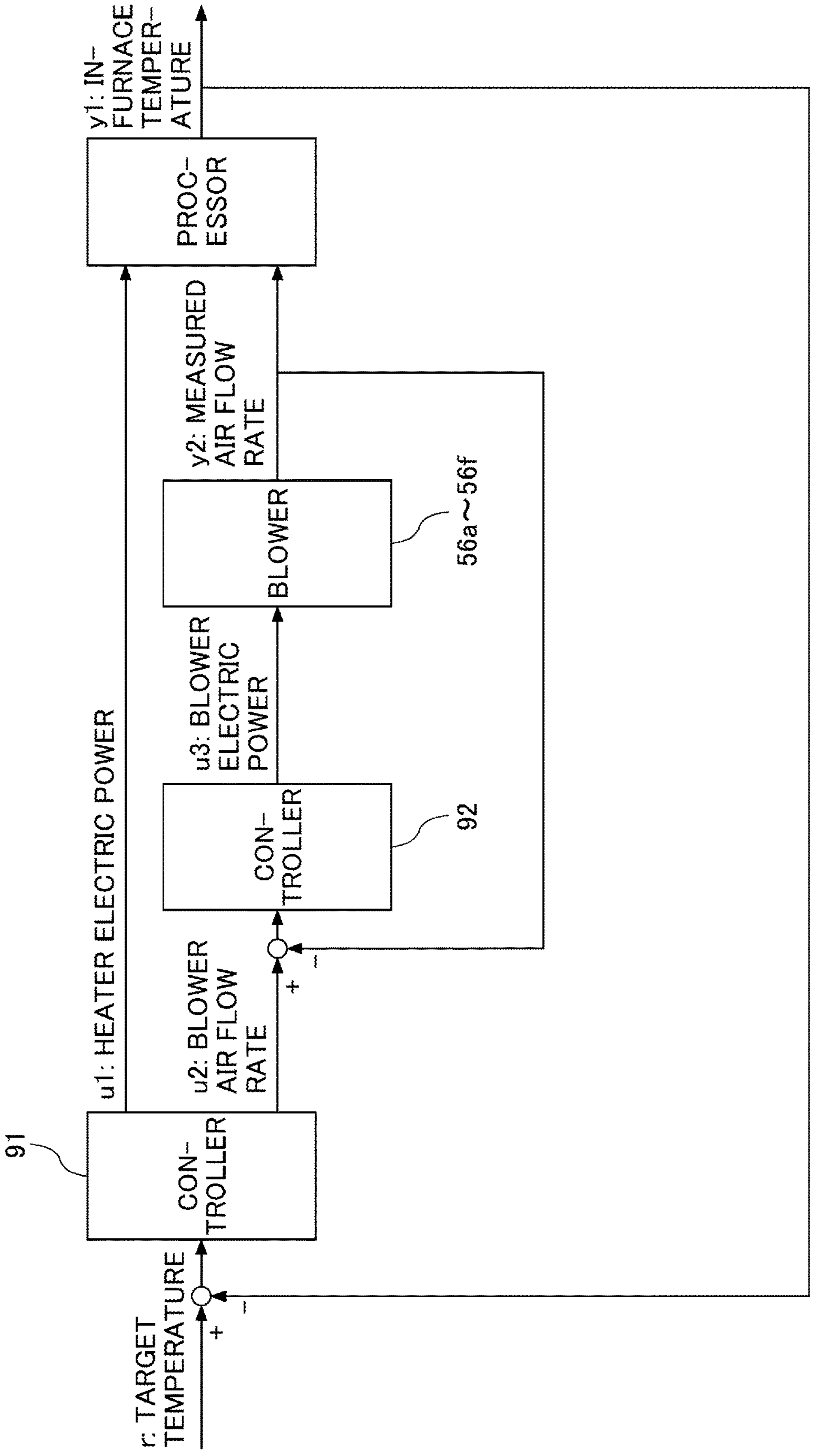
FIG. 10 is a control block diagram for explaining an example of air flow rate control.
Figure 11:
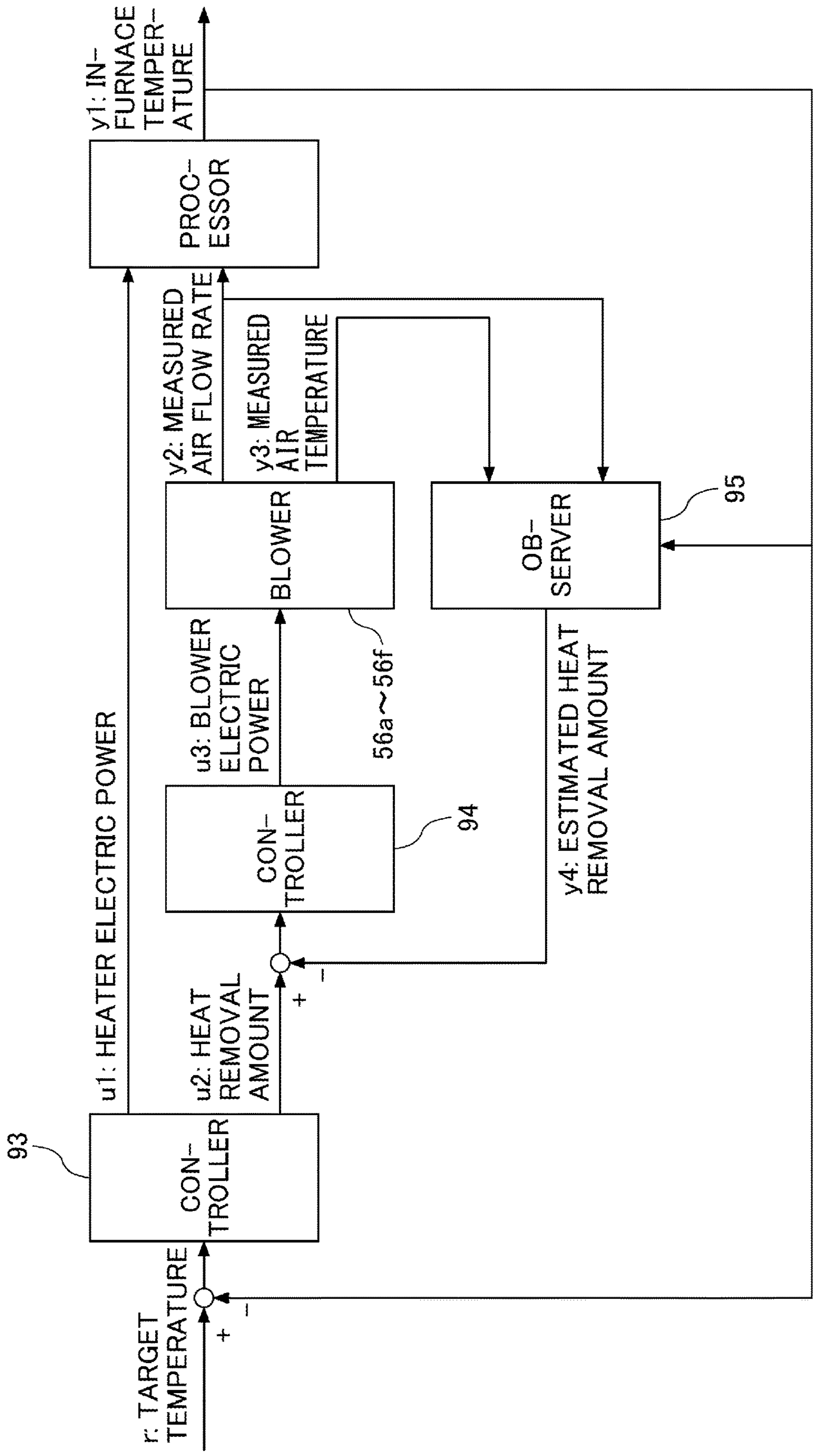
FIG. 11 is a control block diagram for explaining an example of another air flow rate control.

Referring to FIGS. 9 to 11, an example of the heat treatment apparatus 1E according to the sixth embodiment will be described.

The heat treatment apparatus 1E according to the sixth embodiment differs from the heat treatment apparatus 1 in that the rotation speed of the blowers 56$a$ to 56$f$ are controlled based on the detected value of at least one of the flow meters 67$a$ to 67$f$ and the temperature sensors 68$a$ to 68$f$ provided corresponding to each of the flowing paths 51$a$ to 51$f$. The other configurations may be the same as those of the heat treatment apparatus 1. In the following, different points from the heat treatment apparatus 1 will be mainly described.

The flow meters 67_a_ to 67_f_ are provided corresponding to each of the flowing paths 51_a_ to 51_f_. The flow meters 67_a_ to 67_f_ detect the flow rate (an example of a characteristic value) of the cooling medium flowing through the corresponding flowing paths 51_a_ to 51_f_, and transmit the detected value to the controller 90.

The temperature sensors 68_a_ to 68_f_ are provided corresponding to each of the flowing paths 51_a_ to 51_f_. The temperature sensors 68_a_ to 68_f_ detect the temperature (an example of a characteristic value) of the cooling medium flowing through the corresponding flowing paths 51_a_ to 51_f_, and transmit the detected value to the controller 90.

The controller 90 controls the rotation speed of the blowers 56_a_ to 56_f_ based on the detected value of at least one of the flow meters 67_a_ to 67_f_ and the temperature sensors 68_a_ to 68_f_.

For example, as illustrated in FIG. 10, the controller 90 includes a controller 91 and a controller 92. The controller 91 outputs a heater electric power u1 to the processor (the heater 30) and outputs the blower air flow rate u2 to the controller 92 so that an in-furnace temperature y1 is equal to a target temperature r. The in-furnace temperature y1 is, for example, a value detected by the temperature detector 70. The target temperature r is, for example, a temperature determined by a recipe and the like. The controller 92 outputs a blower electric power u3 to the blowers 56_a_ to 56_f_ so that the measured air flow rate y2 is equal to the blower air flow rate u2. The measured air flow rate y2 is, for example, a value detected by the flow meters 67_a_ to 67_f_. The blowers 56_a_ to 56_f_ send the cooling medium to the processor (the space A) by rotating at a rotation speed corresponding to the blower electric power u3. The controllers 91 and 92 may be provided separately from the controller 90.

As illustrated in FIG. 11, the controller 90 may also include a controller 93, a controller 94, and an observer 95, for example. The controller 93 outputs the heater electric power u1 to the processor (the heater 30) and outputs the heat removal amount u2 to the controller 94 so that the in-furnace temperature y1 is equal to the target temperature r. The in-furnace temperature y1 is, for example, a value detected by the temperature detector 70. The target temperature r is, for example, a temperature determined by a recipe and the like. The controller 94 outputs the blower electric power u3 to the blowers 56_a_ to 56_f_ so that the estimated heat removal amount y4 is equal to the heat removal amount u2. The observer 95 calculates the estimated heat removal amount y4 based on the in-furnace temperature y1, the measured air flow rate y2, and the measured air temperature y3, using the following equation. The measured air flow rate y2 is, for example, a value detected by the flow meters 67_a_ to 67_f_. The measured air temperature y3 is, for example, a value detected by the temperature sensors 68_a_ to 68_f_. The blowers 56_a_ to 56_f_ send the cooling medium to the processor (the space A) by rotating at a rotation speed corresponding to the blower electric power u3. The controllers 93 and 94 and the observer 95 may be provided separately from the controller 90.

$$y4=\rho * y2 * C * (y1-y3)$$ (ρ: density of air, C: specific heat of air)

As described above, the heat treatment apparatus 1E according to the sixth embodiment has substantially the same configuration as the heat treatment apparatus 1 according to the first embodiment. Therefore, substantially the same effect can be obtained as the heat treatment apparatus 1 according to the first embodiment.

In the heat treatment apparatus 1E according to the sixth embodiment, the controller 90 controls the rotation speed of the blowers 56_a_ to 56_f_ based on the detected value of at least one of the flow meters 67_a_ to 67_f_ and the temperature sensors 68_a_ to 68_f_ provided corresponding to each of the flowing paths 51_a_ to 51_f_. Accordingly, the interplanar temperature variation can be reduced.

Example (Controlled Cooling Process)

First, an example will be described in which the temperature controllability when the heat treatment apparatus 1 is subjected to the controlled cooling treatment is evaluated.

In Example 1, the heater 30 was controlled based on the temperature detected by the temperature detector 70 while independently controlling the voltages supplied to each of the blowers 56_a_ to 56_f_, and the temperature in the processing container 10 was lowered from 400° C. to 200° C. During the period in which the temperature in the processing container 10 was being lowered, the time-course change in the temperature of each region was measured. The voltages supplied to each of the blowers 56_a_ to 56_f_ in Example 1 are as illustrated in Table 1 below.

TABLE 1

| | VOLTAGE [V] | | | | | |
|---|---|---|---|---|---|---|
| TIME | BTM (56a) | CTR-1 (56b) | CTR-2 (56c) | CTR-3 (56d) | CTR-4 (56e) | TOP (56f) |
| 0 MINUTES (START) | 4 | 4 | 4 | 4 | 4 | 4 |
| 5 MINUTES | 2 | 2 | 2 | 2 | 3 | 4 |
| 10 MINUTES | 1.5 | 1.5 | 1.5 | 1.5 | 2 | 4.5 |
| 20 MINUTES | 1.2 | 1.2 | 1.2 | 1 | 1.5 | 4.5 |
| 30 MINUTES | 1 | 1 | 1.2 | 1 | 1.5 | 4.5 |

As illustrated in Table 1, in Example 1, at the start of the process, the voltages supplied to each of the blowers 56_a_ to 56_f_ were set to 4 V. Subsequently, 5 minutes after the start of the process, the voltages supplied to the blowers 56_a_ to 56_d_ were changed from 4 V to 2 V, and the voltage supplied to the blower 56_e_ was changed from 4 V to 3 V. Then, 10 minutes after the start of the process, the voltages supplied to the blowers 56_a_ to 56_d_ were changed from 2 V to 1.5 V, the voltage supplied to the blower 56_e_ was changed from 3 V to 2 V, and the voltage supplied to the blower 56_f_ was changed from 4 V to 4.5 V. Then, minutes after the start of the process, the voltages supplied to the blowers 56_a_ to 56_c_ were changed from 1.5 V to 1.2 V, the voltage supplied to the blower 56_d_ was changed from 1.5 V to 1 V, and the voltage supplied to the blower 56_e_ was changed from 2 V to 1.5 V. Then, 30 minutes after the start of the process, the voltages supplied to the blowers 56_a_ and 56_b_ were changed from 1.2 V to 1 V.

In Comparative Example 1, the heater 30 was controlled based on the temperature detected by the temperature detector 70 while controlling the voltages supplied to each of the blowers 56_a_ to 56_f_ to be constant, and the temperature in the processing container 10 was lowered from 400° C. to 200° C. During the period in which the temperature in the processing container 10 was being lowered, the time-course change in the temperature of each region was measured. The voltages supplied to each of the blowers 56_a_ to 56_f_ in Comparative Example 1 are as illustrated in Table 2 below.

TABLE 2

| TIME | VOLTAGE [V] BTM (56a) | CTR-1 (56b) | CTR-2 (56c) | CTR-3 (56d) | CTR-4 (56e) | TOP (56f) |
|---|---|---|---|---|---|---|
| 0 MINUTES (START) | 4 | 4 | 4 | 4 | 4 | 4 |

As illustrated in Table 2, in Comparative Example 1, at the start of the process, the voltages supplied to each of the blowers 56_a_ to 56_f_ were set to 4 V, and the voltage was fixed to 4 V without changing the voltages supplied to each of the blowers 56_a_ to 56_f_.

Figure 12:
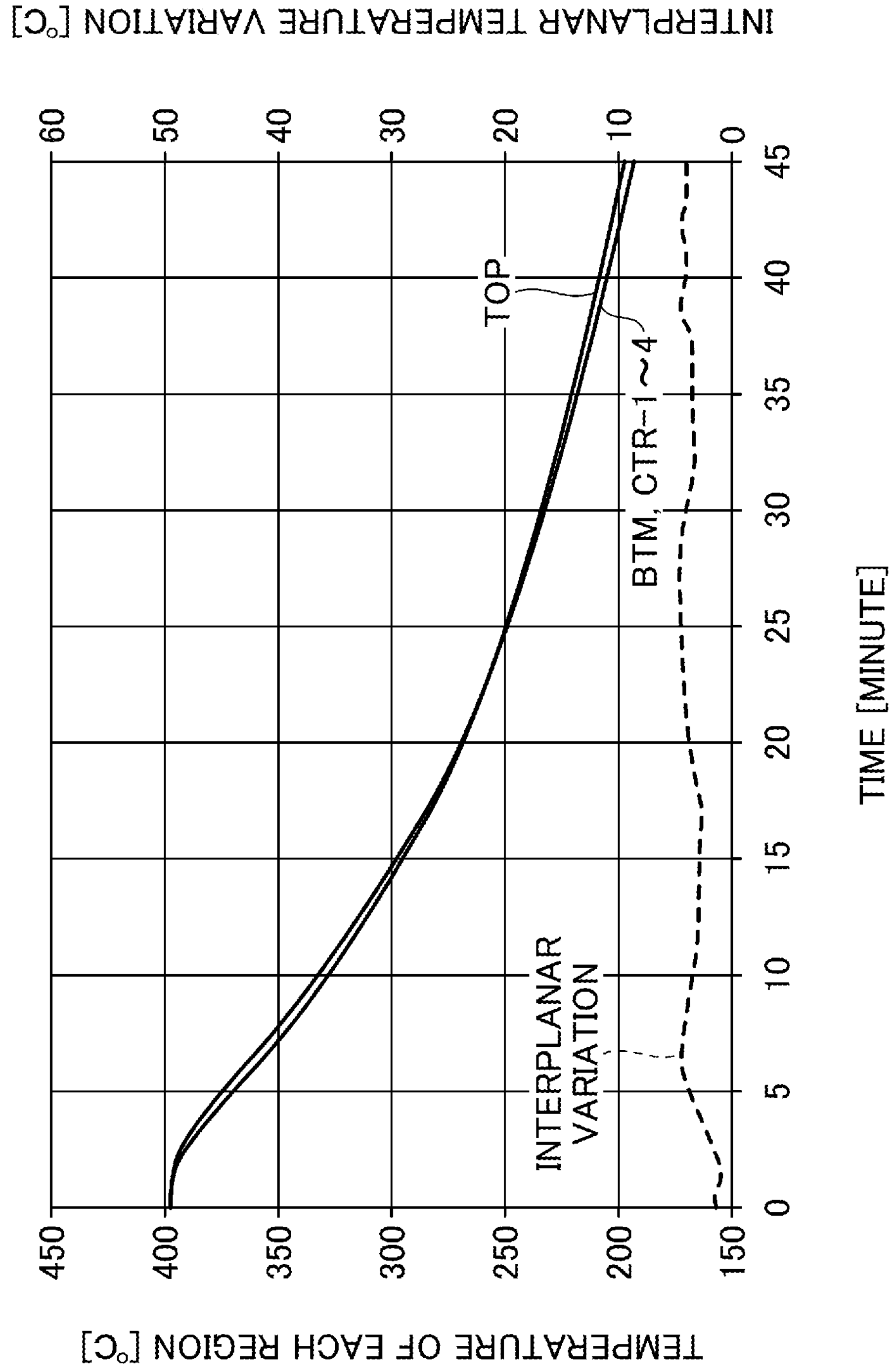
FIG. 12 is a diagram illustrating measurement results of temperature characteristics of each region in a controlled cooling process.
Figure 13:
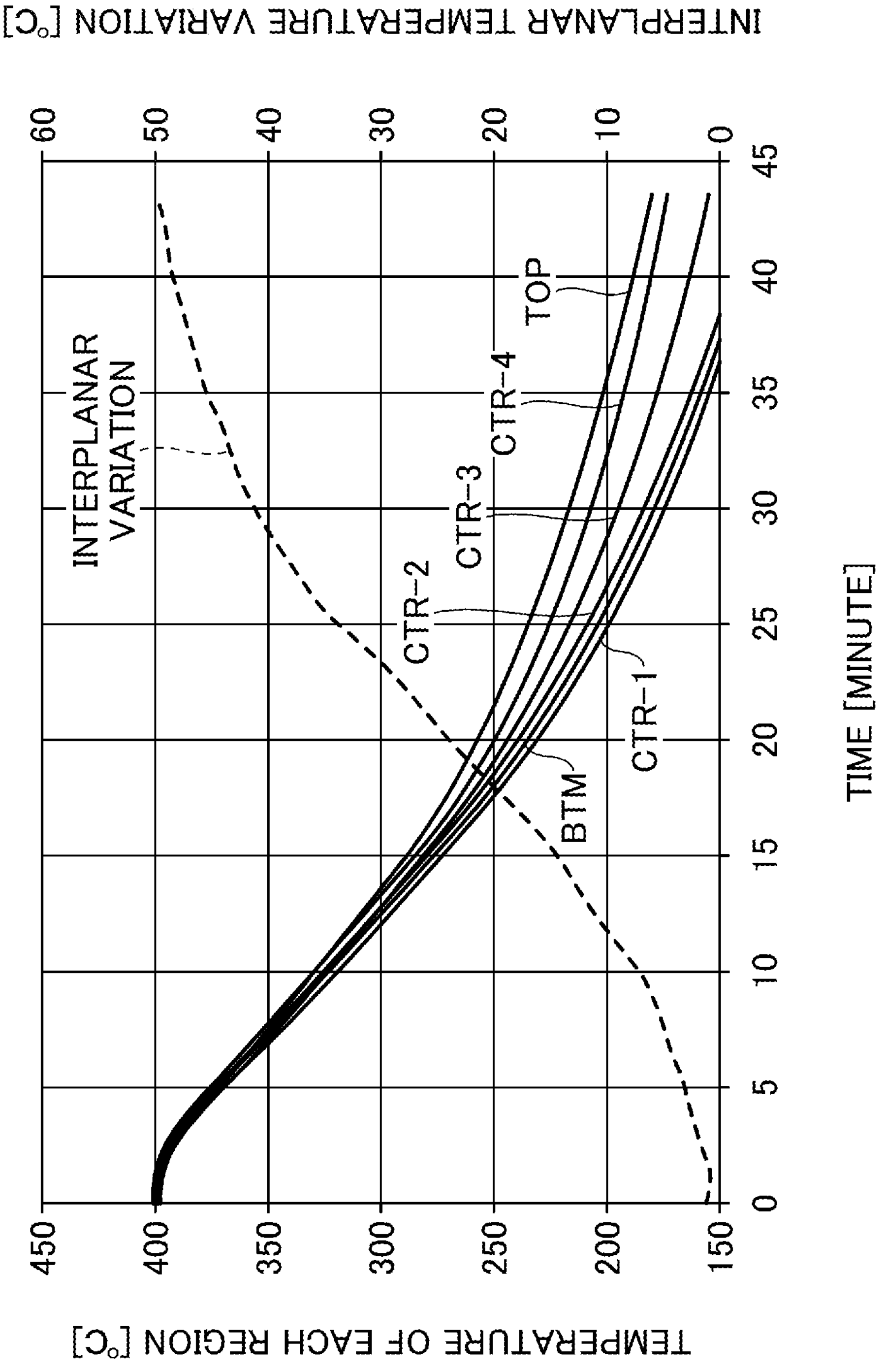
FIG. 13 is a diagram illustrating measurement results of temperature characteristics of each region in the controlled cooling process.

FIGS. 12 and 13 are diagrams illustrating the measurement results of the temperature characteristics of each region in the controlled cooling process. FIG. 12 illustrates the results of Example 1, and FIG. 13 illustrates the results of Comparative Example 1. In FIGS. 12 and 13, the horizontal axis indicates time [minute], the first vertical axis (vertical axis on the left side) indicates temperature of each region [° C.], and the second vertical axis (vertical axis on the right side) indicates interplanar temperature variation [° C.]. In FIGS. 12 and 13, the solid line indicates the temperature of each region, and the dashed line indicates the interplanar temperature variation. The interplanar temperature variation is a value obtained by subtracting the minimum temperature from the maximum temperature, among the temperatures of all regions.

As illustrated in FIG. 12, in Example 1, it can be seen that the temperature lowering rate is substantially the same in all regions (BTM, CTR-1 to CTR-4, and TOP). In addition, in Example 1, the interplanar temperature variation was 4.3° C. at the time when the temperatures in all regions became 200° C. or less.

In contrast, as illustrated in FIG. 13, in Comparative Example 1, it can be seen that the temperature lowering rate varies between each region, and that the top region has a lower temperature lowering rate compared to the bottom region. In addition, in Comparative Example 1, the interplanar temperature variation was 45.5° C. at the time when the temperatures in all regions became 200° C. or less.

From the results of Example 1 and Comparative Example 1 described above, it was shown that in the controlled cooling process, by independently controlling the voltages supplied to each of the blowers 56_a_ to 56_f_, the interplanar temperature variation can be reduced compared to the case where the voltages supplied to each of the blowers 56_a_ to 56_f_ are controlled to be constant.

(Low Temperature Process)

Next, an example will be described in which the temperature controllability when the heat treatment apparatus 1 is subjected to the low temperature process is evaluated.

In this example, tilt controlling was performed in which the control temperature of the top region (TOP) was set to be lower than the control temperature of the other regions (BTM, and CTR-1 to CTR-4) under all conditions (conditions 1 to 5). The control temperatures for each region in the conditions 1 to 5 are as illustrated in Table 3 below.

TABLE 3

| | CONTROL TEMPERATURE [° C.] BTM | CTR-1 | CTR-2 | CTR-3 | CTR-4 | TOP |
|---|---|---|---|---|---|---|
| CONDITIONS 1 TO 5 | 55 | 55 | 55 | 55 | 55 | 52 |

As illustrated in Table 3, under all conditions (the conditions 1 to 5), the control temperatures in the bottom region, first center region, second center region, third center region, and fourth center region were set to 55° C. and the control temperature in the top region was set to 52° C.

In the conditions 1 to 4, the heater 30 was controlled based on the temperature detected by the temperature detector 70 while independently controlling the voltages supplied to each of the blowers 56_a_ to 56_f_, and the temperature in the processing container 10 was regulated to a low temperature. In the condition 5, the heater 30 was controlled based on the temperature detected by the temperature detector 70 while controlling the voltages supplied to each of the blowers 56_a_ to 56_f_ to be constant, and the temperature in the processing container 10 was regulated to a low temperature. The voltages supplied to each of the blower 56_a_ to 56_f_ in the conditions 1 to 5 are as illustrated in Table 4 below.

TABLE 4

| | VOLTAGE [V] BTM (56a) | CTR-1 (56b) | CTR-2 (56c) | CTR-3 (56d) | CTR-4 (56e) | TOP (56f) |
|---|---|---|---|---|---|---|
| CONDITION 1 | 1 | 1 | 1 | 1 | 1 | 4 |
| CONDITION 2 | 1 | 1 | 1 | 1 | 0.7 | 4.5 |
| CONDITION 3 | 0.7 | 0.7 | 0.7 | 0.7 | 0.7 | 4.5 |
| CONDITION 4 | 0 | 0 | 0 | 0 | 0 | 4.5 |
| CONDITION 5 | 4 | 4 | 4 | 4 | 4 | 4 |

As illustrated in Table 4, in the condition 1, the voltages supplied to the blowers 56_a_ to 56_e_ were set to 1 V and the voltage supplied to the blower 56_f_ was set to 4 V. In the condition 2, the voltages supplied to the blowers 56_a_ to 56_d_ were set to 1 V, the voltage supplied to the blower 56_e_ was set to 0.7 V, and the voltage supplied to the blower 56_f_ was set to 4.5 V. In the condition 3, the voltages supplied to the blowers 56_a_ to 56_e_ were set to 0.7 V and the voltage supplied to the blower 56_f_ was set to 4.5 V. In the condition 4, the voltages supplied to the blowers 56_a_ to 56_e_ were set to 0 V and the voltage supplied to the blower 56_f_ was set to 4.5 V. In the condition 5, the voltages supplied to the blowers 56_a_ to 56_f_ were set to 4V.

Figure 14:
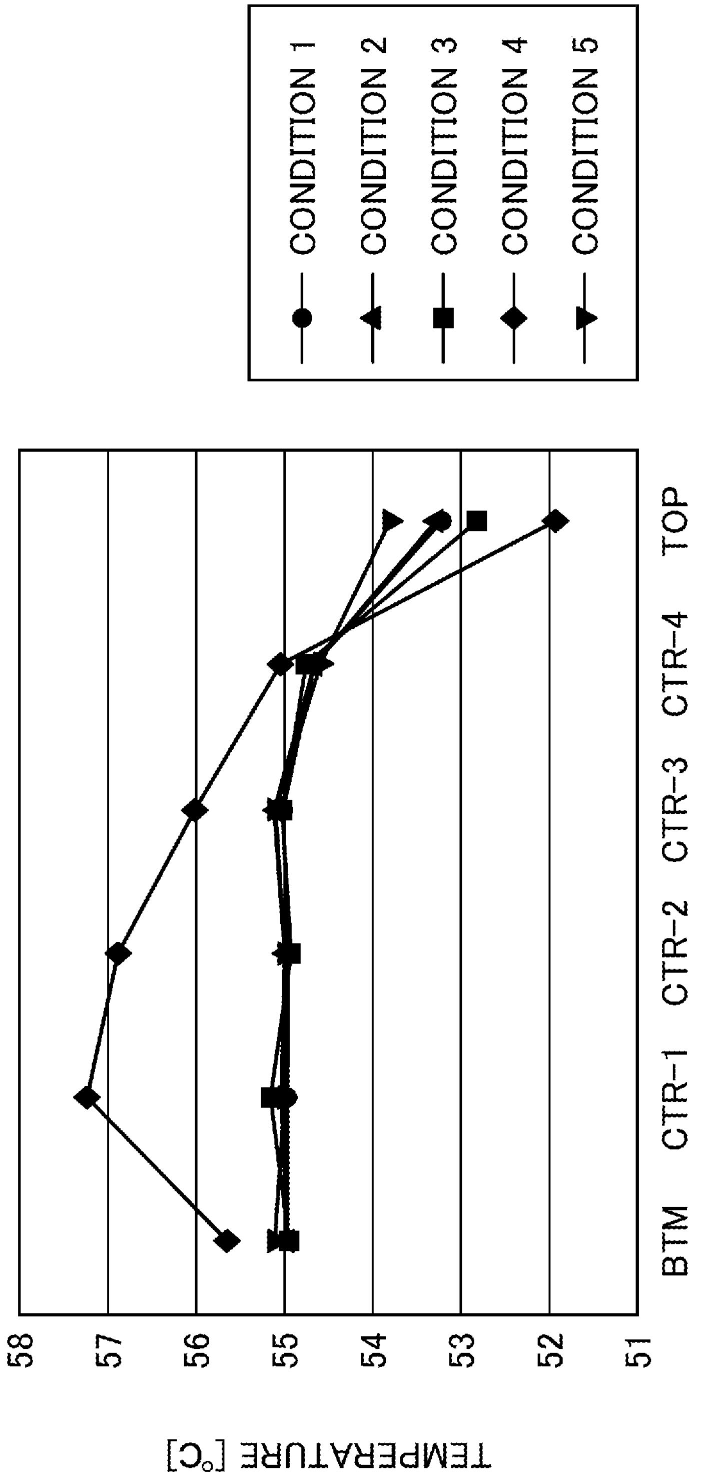
FIG. 14 is a diagram illustrating measurement results of temperatures achieved in each region in a low temperature process.

FIG. 14 is a diagram illustrating the measurement result of the temperatures achieved in each region in the low temperature process. FIG. 14 illustrates the temperature [° C.] of each region for each of the conditions 1 to 5. In FIG. 14, circles, triangles, squares, diamonds, and inverse triangles indicate the results of the condition 1, the condition 2, the condition 3, the condition 4, and the condition 5, respectively.

As illustrated in FIG. 14, in the conditions 1 and 2, the temperatures in the regions where the control temperature was set to 55° C. (BTM, and CTR-1 to CTR-4) were almost the same as the control temperature, and the temperatures in the region where the control temperature was set to 52° C. (TOP) were both 53.2° C.

In the condition 3, the temperatures in the regions where the control temperature was set to 55° C. (BTM, and CTR-1 to CTR-4) were almost the same as the control temperature, and the temperature in the region where the control temperature was set to 52° C. (TOP) was 52.8° C.

In the condition 4, the temperatures in the regions where the control temperature was set to 55° C. (BTM, and CTR-1 to CTR-3) were higher than 55° C., and the temperature in the regions where the control temperature was set to 55° C. (CTR-4) and where the control temperature was set to 52° C. (TOP) were almost the same as the control temperature.

In the condition 5, the temperatures in the regions where the control temperature was set to 55° C. (BTM, and CTR-1 to CTR-4) was almost the same as the control temperature, and the temperature in the region where the control temperature was set to 52° C. (TOP) was 53.8° C.

From the results of the conditions 1 to 3 and 5, it can be said that the temperature controllability when performing tilt controlling at low temperature is improved by independently controlling the voltages supplied to each of the blowers 56*a* to 56*f* and increasing the voltage supplied to the blower 56*f* provided corresponding to a region (TOP) having a relatively low control temperature.

From the results of the conditions 1 to 3, it can be said that the temperature controllability when performing tilt controlling at low temperature is further improved by making a large difference in the voltages supplied to the blowers 56*a* to 56*f* between the region in which the control temperature is relatively low (TOP) and the region in which the control temperature is relatively high (BTM, CTR-1 to 4).

From the results of the conditions 3 and 4, it can be said that the temperature controllability deteriorates when the voltage supplied to the blowers 56*a* to 56*e* that are provided corresponding to the regions having a relatively high control temperature (BTM, CTR-1 to CTR-4) is set to 0 V.

The embodiments disclosed herein should be considered to be exemplary in all respects and not limiting. The above embodiments may be omitted, substituted, or modified in various forms without departing from the appended claims and spirit thereof.

According to the present disclosure, interplanar temperature variation can be reduced.

The invention claimed is:

1. A heat treatment apparatus comprising:

a cylindrical processing container;

a heater configured to heat the processing container; and a cooler configured to cool the processing container, wherein the cooler includes:

discharge holes provided at intervals in a longitudinal direction of the processing container, the discharge holes being configured to discharge a cooling medium toward the processing container;

a branch configured to divide the cooling medium into a plurality of flowing paths that communicate with the discharge holes; and blowers provided for respective ones of the flowing paths, the blowers being configured to send the cooling medium to the discharge holes that communicate with the respective ones of the flowing paths, and wherein the branch includes a plurality of branch chambers provided in multiple stages.

2. The heat treatment apparatus according to claim 1, further comprising check valves provided for the respective ones of the flowing paths, the check valves being configured to prevent backflow of the cooling medium from the discharge holes that communicate with the respective ones of the flowing paths to respective ones of the blowers.

3. The heat treatment apparatus according to claim 2, further comprising a controller configured to independently control each of the blowers.

4. The heat treatment apparatus according to claim 3, further comprising sensors provided for respective ones of the flowing paths, the sensors configured to detect a characteristic value of the respective ones of the flowing paths, wherein the controller monitors backflow of the cooling medium based on detected values of the sensors.

5. The heat treatment apparatus according to claim 4, further comprising sensors provided for respective ones of the flowing paths, the sensors configured to detect a characteristic value of the respective ones of the flowing paths, wherein the controller controls rotation speeds of the blowers based on detected values of the sensors.

6. The heat treatment apparatus according to claim 5, wherein the characteristic value includes temperature of the cooling medium sent from the blowers to the discharge holes.

7. The heat treatment apparatus according to claim 6, wherein the characteristic value includes a differential pressure before and after the blowers.

8. The heat treatment apparatus according to claim 7, wherein the characteristic value includes a flow rate of the cooling medium sent from the blowers to the discharge holes.

9. The heat treatment apparatus according to claim 1, further comprising a controller configured to independently control each of the blowers.

10. The heat treatment apparatus according to claim 9, further comprising sensors provided for respective ones of the flowing paths, the sensors configured to detect a characteristic value of the respective ones of the flowing paths, wherein the controller monitors backflow of the cooling medium based on detected values of the sensors.

11. The heat treatment apparatus according to claim 10, wherein the characteristic value includes temperature of the cooling medium sent from the blowers to the discharge holes.

12. The heat treatment apparatus according to claim 10, wherein the characteristic value includes a differential pressure before and after the blowers.

13. The heat treatment apparatus according to claim 10, wherein the characteristic value includes a flow rate of the cooling medium sent from the blowers to the discharge holes.

14. The heat treatment apparatus according to claim 9, further comprising sensors provided for respective ones of the flowing paths, the sensors configured to detect a characteristic value of the respective ones of the flowing paths, wherein the controller controls rotation speeds of the blowers based on detected values of the sensors.

15. A heat treatment method in a heat treatment apparatus, the heat treatment apparatus including:

a heater configured to heat a cylindrical processing container; and a cooler configured to cool the processing container, wherein the cooler includes:

discharge holes provided at intervals in a longitudinal direction of the processing container, the discharge holes being configured to discharge a cooling medium toward the processing container;

a branch configured to divide the cooling medium into a plurality of flowing paths that communicate with the discharge holes; and blowers provided for respective ones of the flowing paths, the blowers being configured to send the cooling medium to the discharge holes that communicate with the respective ones of the flowing paths, and wherein the branch includes a plurality of branch chambers provided in multiple stages, wherein when a heat treatment is performed in the processing container, the respective ones of the blowers are independently controlled according to a condition of the heat treatment.

* * * * *